United States Patent
Sugimoto et al.

[11] Patent Number: 5,349,486
[45] Date of Patent: Sep. 20, 1994

[54] MAGNETIC DISK STORAGE APPARATUS HAVING A VIBRATION PROOF STRUCTURE

[75] Inventors: Masaharu Sugimoto, Kawasaki; Keiji Aruga, Hiratsuka; Tomoyoshi Yamada, Yokohama; Takahiro Imamura, Fujisawa; Yoshifumi Mizoshita, Tama, all of Japan

[73] Assignee: Fujitsu Limited, Kawasaki, Japan

[21] Appl. No.: 954,951

[22] Filed: Sep. 29, 1992

Related U.S. Application Data

[63] Continuation of Ser. No. 584,149, Sep. 18, 1990, abandoned.

[30] Foreign Application Priority Data

| Sep. 18, 1989 | [JP] | Japan | 1-240198 |
| Oct. 19, 1989 | [JP] | Japan | 1-270450 |
| Feb. 20, 1990 | [JP] | Japan | 2-037196 |
| Mar. 9, 1990 | [JP] | Japan | 2-056422 |

[51] Int. Cl.$^5$ .............. G11B 5/012; G11B 33/14; F16M 13/00
[52] U.S. Cl. .............. 360/97.01; 360/97.03; 360/105; 248/632; 248/634
[58] Field of Search .......... 360/97.01–97.04, 360/98.01, 104–106; 248/632, 634

[56] References Cited

U.S. PATENT DOCUMENTS

| 3,484,760 | 12/1969 | Perkins et al. | 360/106 |
| 3,886,595 | 5/1975 | Swaim et al. | 360/97.01 |
| 4,263,629 | 4/1981 | Hatch | 360/98.01 |
| 4,642,715 | 2/1987 | Ende | 360/97.02 |
| 4,713,714 | 12/1987 | Gatti et al. | 360/97.01 |
| 4,812,932 | 3/1989 | Hishinuma et al. | 360/97.01 |
| 4,893,210 | 1/1990 | Mintzlaff | 360/97.01 |
| 4,933,785 | 6/1990 | Morehouse et al. | 360/105 |
| 4,999,724 | 3/1991 | McAllister et al. | 360/98.08 |

FOREIGN PATENT DOCUMENTS

| 61-162884 | 7/1986 | Japan. |
| 62-092197 | 4/1987 | Japan. |
| 2179421 | 3/1987 | United Kingdom. |

*Primary Examiner*—Stuart S. Levy
*Assistant Examiner*—Jefferson Evans
*Attorney, Agent, or Firm*—Staas & Halsey

[57] ABSTRACT

A magnetic disk storage apparatus comprising a rotary actuator which prevents head positioning error resulting from vibration and impact. Since head positioning error is generated when the enclosure makes rotating movement due to translational vibration input due to vibration, a vibration proof mechanism consisting of a plurality of vibration proof supporting members are provided between the enclosure and frame. The plural vibration proof supporting members are disposed so that the linear moment around the gravity center of the enclosure is balanced against translational external force applied to the enclosure.

25 Claims, 14 Drawing Sheets

F I G. 4
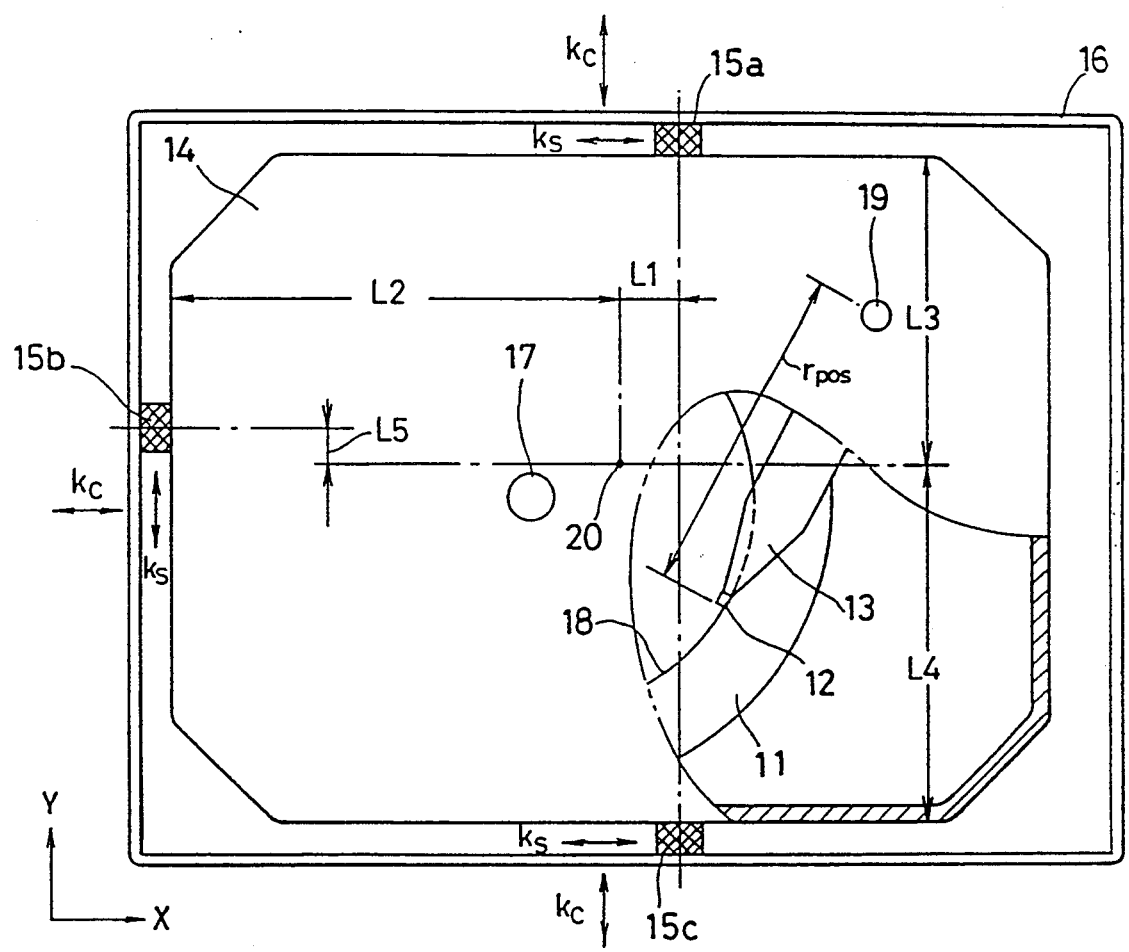

F I G. 13
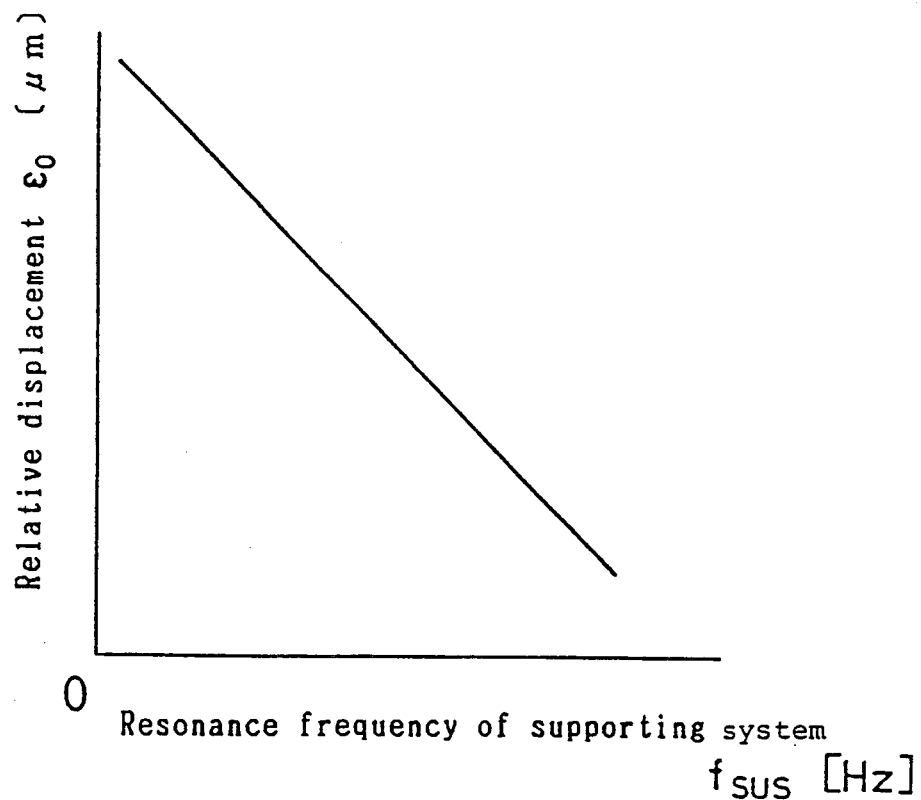
F I G. 14
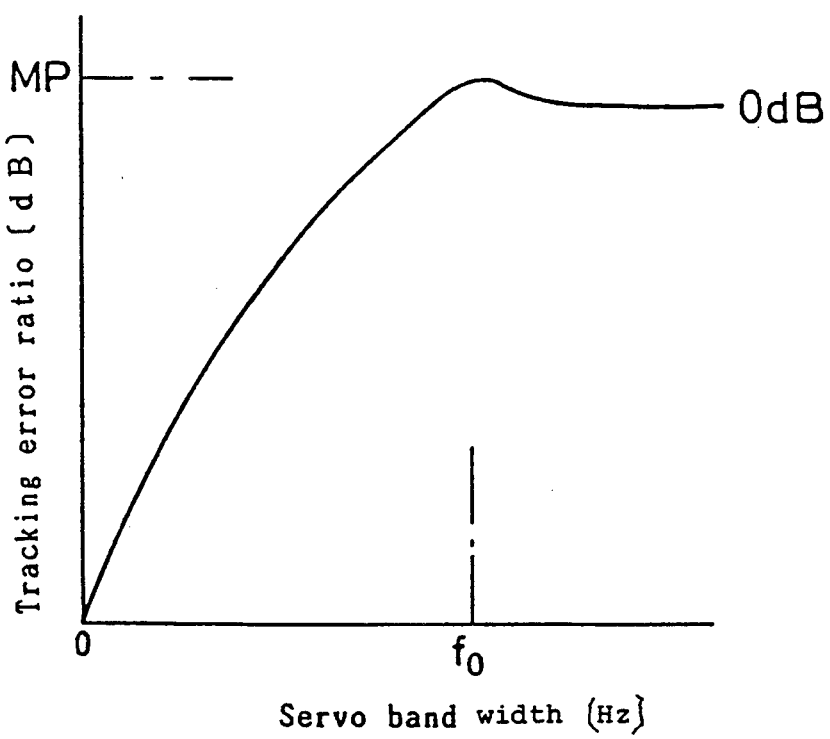

F I G. 18
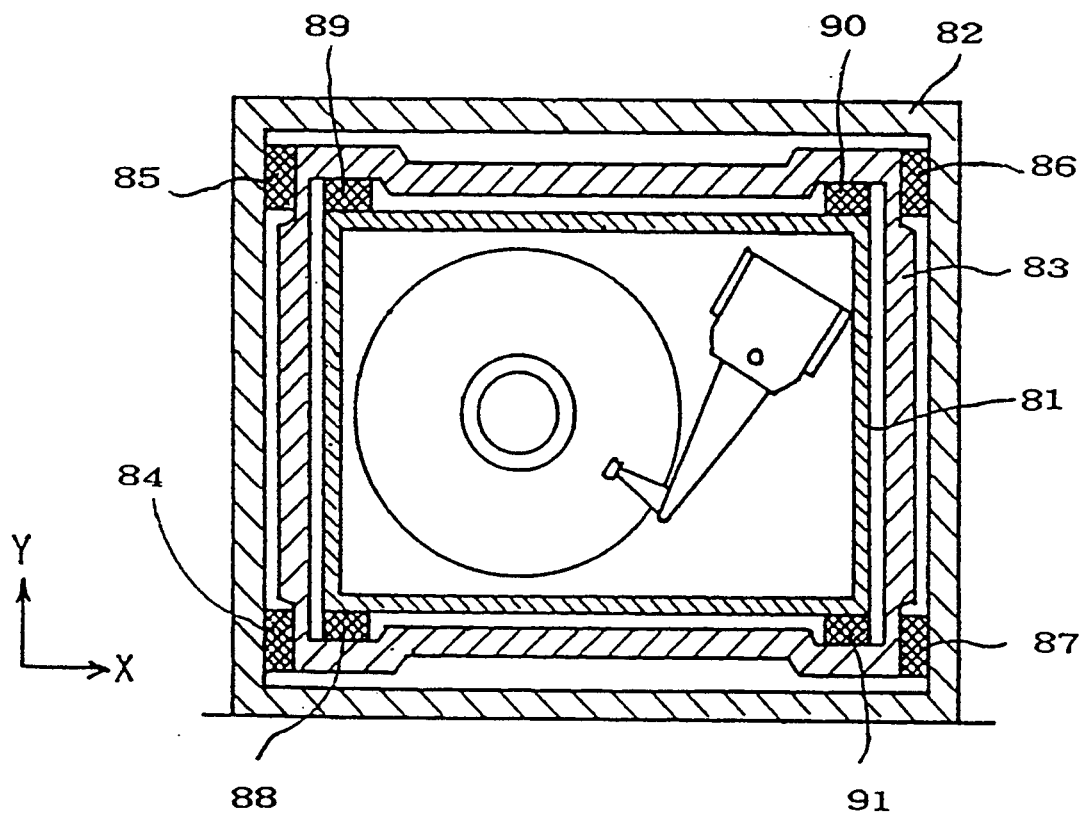

MAGNETIC DISK STORAGE APPARATUS HAVING A VIBRATION PROOF STRUCTURE

This application is a continuation of application Ser. No. 07/584,149, filed Sep. 18, 1990, now abandoned.

BACKGROUND OF THE INVENTION

1. Field of the Invention

The present invention relates to a magnetic disk storage apparatus providing a rotary head positioning mechanism and particularly to such a storage apparatus having a vibration proof structure an improved head positioning accuracy.

2. Description of the Prior Art

A head positioning mechanism is usually called a positioner or actuator and two kinds of apparatuses of linear type and rotary type mechanisms have been proposed. A rotary type head positioning mechanism is recently employed widely because it can be reduced in size in comparison with the linear type. For the convenience of explanation, the rotary type head positioning mechanism is hereinafter described as a rotary actuator.

FIG. 1 is a sectional view of schematic structure of a magnetic disk storage apparatus providing a conventional ordinary rotary head positioning mechanism and FIG. 2 is a plan view of the essential portion thereof. In these figures, three magnetic disks 112, for example, are rotatably supported by a spindle 113 in the enclosure 111 and these disks 112 are rotated at a constant speed, for example, of 3600 rpm by a spindle motor 114. The magnetic heads 115 are coupled with head arms 117 through suspension springs 116 and are positioned to the designated tracks of the magnetic disks 112 by the rotary actuator.

The rotary actuator is composed of a rotary member 118 which fixes head arms 117 and is rotatably supported by the enclosure 111 and a positioning motor, for example, a voice coil motor 119 for rotating such member 118 to rotate magnetic heads 115 through a specified angle about the rotating axis of the rotating member 118. This actuator also takes balance between the head arm side and motor side by setting the gravity center to the rotating axis of the rotating member 118 to eliminate positioning error for vibration input in the translational direction.

Moreover, in a magnetic disk storage apparatus for realizing high recording density, a closed loop servo control means is employed for controlling positioning of the actuator. This closed loop servo control means discriminates the current position of a magnetic head from the original point by reading servo information on the magnetic disk with the magnetic head, also computes distance up to the designated track position from the current position and drives the positioning motor based on the result of computation to position the magnetic head at the designated track.

In such a magnetic disk storage apparatus providing such a rotary actuator, positioning error may be generated easily by rotary movement (motion) generated by external vibration or impact. Namely, when vibration in the translational direction within the plane perpendicular to the rotating axis of the disk is applied, a rotating movement component is generated on the enclosure. In this case, a rotating force is not applied and only translational force is applied in the balanced actuator, namely a movement different from that of the enclosure is carried out in the actuator. Therefore, the relative positions of the disk and the head deviate, generating a positioning error. Even in an unbalanced actuator, such a positioning error is also generated.

In the prior art, it has been considered to make large such servo gain in order to reduce such positioning error but it has a limitation and it is generally attempted to employ the structure to attenuate external vibration or impact by making large an attenuation ratio by loading vibration proof members between the enclosure 111 and the frame. Namely, the conventional apparatus has employed a structure that vibration proof members having spring constant are allocated at the side or bottom plane of the enclosure to support the enclosure with the frame.

Such vibration proof structure has been effective within the practical range for a large size magnetic disk storage apparatus but has been insufficient for a recent small size and large capacity magnetic disk storage apparatus. Namely, in the small size and large capacity disk storage apparatus, the track pitch is very narrow to realize high recording density, the apparatus easily receives vibration or impact because it is mounted to a small size computer such as lap top type apparatus and moreover the apparatus vibrates largely for small vibration input because it is also designed in light weight. Accordingly, the relative position of disk and head is easily deviated for vibration input in the translational direction and thereby head positioning error is easily generated.

SUMMARY OF THE INVENTION

It is the principal object of the present invention to provide a magnetic disk storage apparatus providing a rotary actuator which does not generate positioning error even when vibration is applied in the translational direction.

It is another object of the present invention to provide a magnetic disk storage apparatus providing a vibration proof mechanism of simplified structure.

Briefly, the present invention discloses a magnetic disk storage apparatus providing a rotary actuator which is characterized in that the enclosure is supported by the frame through a plurality of vibration proof supporting members so that the linear moment around the gravity center of enclosure is balanced for the vibration input in the translational direction applied to the enclosure. In short, the linear moment of the spring stiffness of each vibration proof supporting member is balanced for the gravity center of enclosure so that a rotating moment is not generated even when the enclosure is vibrated (excited) in the translational direction.

The other objects and features of the present invention will be well understood from a preferred embodiment of the present invention described with reference to the accompanying drawings.

BRIEF DESCRIPTION OF THE DRAWINGS

FIG. 4 and FIG. 5 are a partial cutout plan view and detail plan view of the magnetic disk storage apparatus providing a rotary actuator to which the present invention is applied;

FIG. 13 indicates the characteristic curves of relationship between relative displacement and the resonance frequency of supporting (suspension) system in FIG. 11;

FIG. 14 indicates the characteristic curves of the relationship between servo bandwidth and tracking error rate of servo control system of FIG. 11;

FIG. 16, FIG. 17 and FIG. 18 are diagrams for explaining other modification example of a magnetic disk storage apparatus of the present invention.

DESCRIPTION OF THE PREFERRED EMBODIMENTS

Prior to description about a preferred embodiment of the present invention, a basic structure of the present invention will be explained with reference to FIG. 3.

Figure 1:
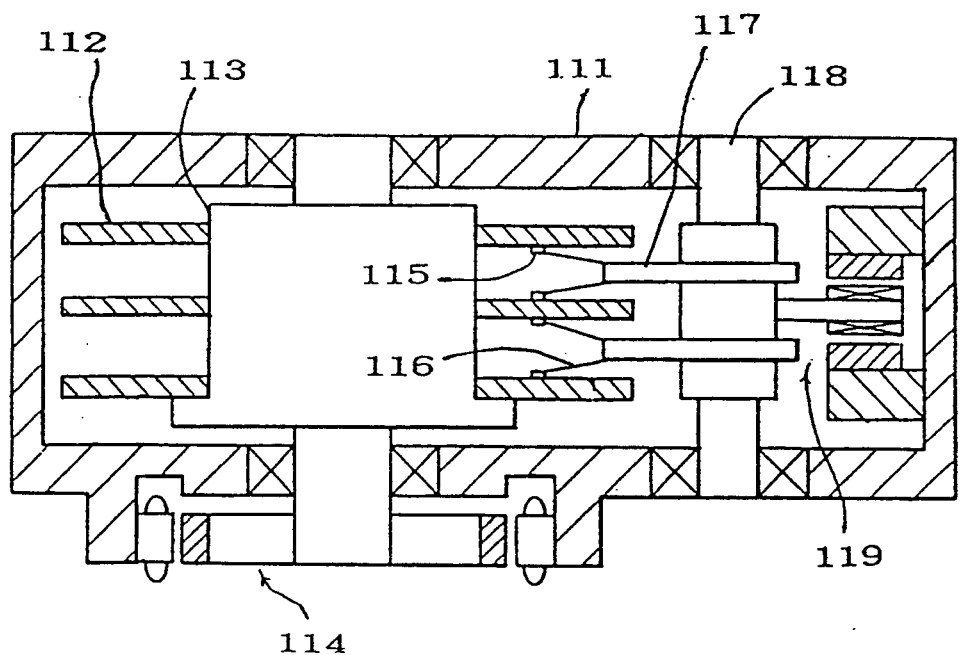
FIG. 1 and FIG. 2 are schematic sectional view and plan view of essential portion of a magnetic disk storage apparatus providing conventional ordinary rotary actuator.
Figure 2:
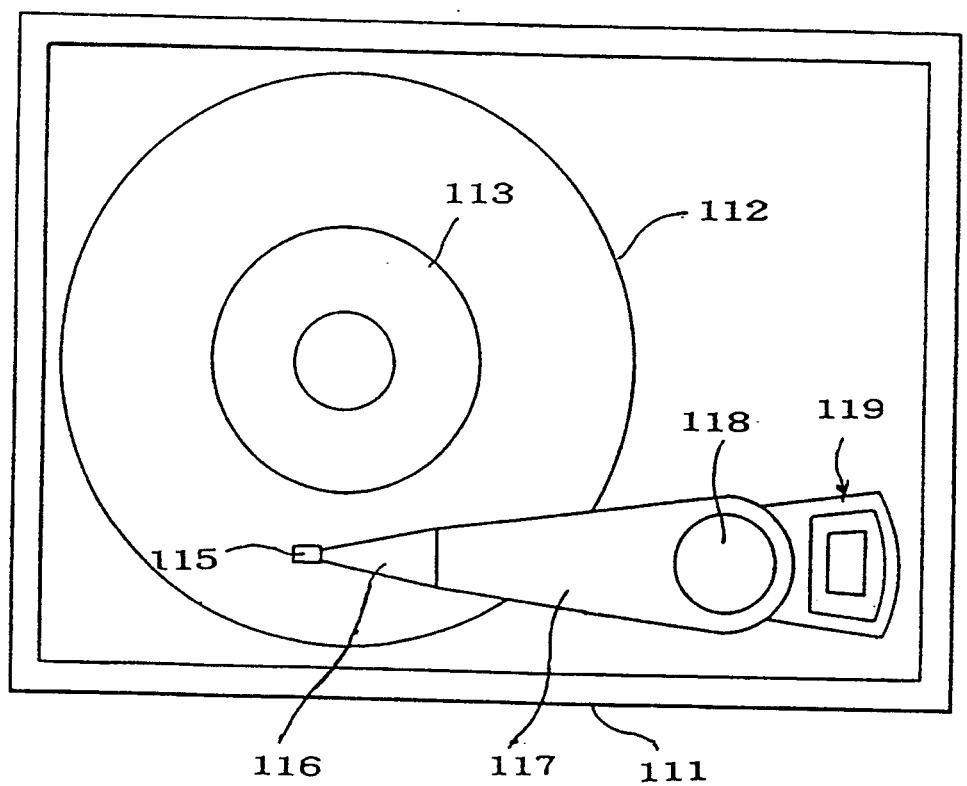
Figure 3A:
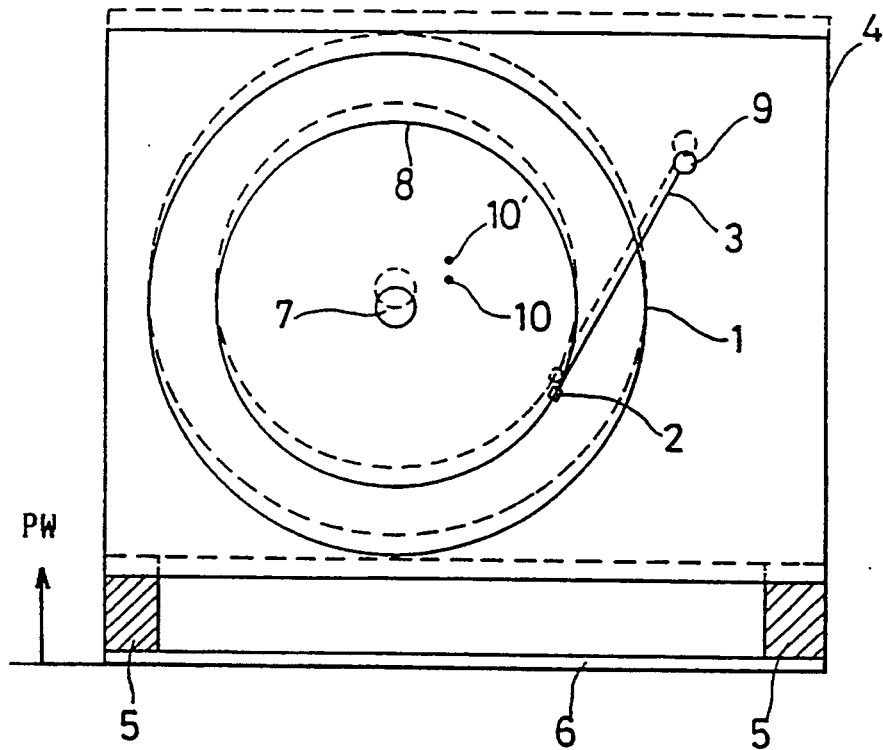
FIGS. 3(A), 3(B) are diagrams for explaining the basic structure and operation principle of the present invention.

Namely, in FIGS. 3(A), (B), the reference numeral 7 denotes the center of spindle for rotating a magnetic disk 1; 8, a track on which a magnetic head is located; 9, center of rotating axis of a rotary actuator 3; 10', gravity center of enclosure when the enclosure moves by the translational operation to the position indicated by a dotted line; 6, frame; 5, 5', vibration proof supporting member.

Figure 3B:
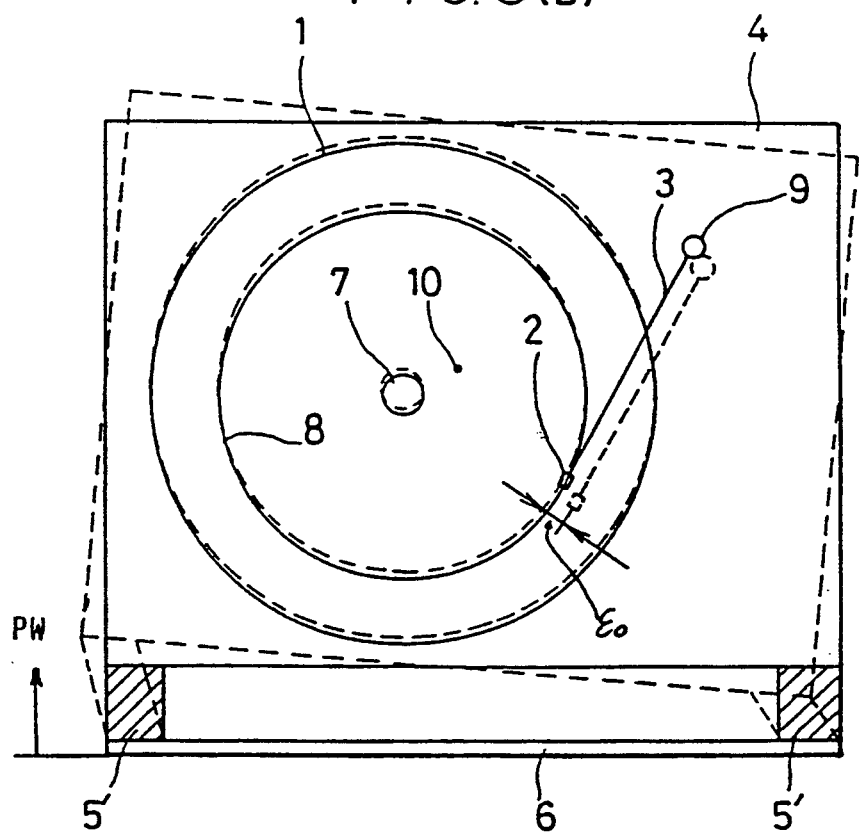

As shown in FIG. 3(B), if the vibration proof supporting member 5' is not provided to balance the primary moment around the gravity center 10 of enclosure for external vibration input in the translational direction, the enclosure 4 makes a rotating movement around the gravity center 10 and thereby the rotary actuator 3 moves to the dotted line position from the solid line position by the translational operation, generating large head positioning error $\epsilon_0$.

Meanwhile, in the case of the present invention shown in FIG. 3(A), the vibration proof supporting member takes balance of the primary moment around the gravity center 10 of enclosure for external vibration input in the translational direction. Therefore, the enclosure conducts only translational movement, the gravity center 10 of enclosure 4 moves to the position 10' and the track of magnetic disk 1 moves to the dotted line position from the solid line position. Therefore, the magnetic head 2 also moves to the dotted line position from the solid line position in parallel thereto and positioning error is almost not generated.

A couple of embodiments of the present invention based on the basic structure explained above will be explained in detail.

FIG. 4 is a partial cutout schematic plan view of a magnetic disk storage apparatus according to a first embodiment. This is almost the same as the conventional apparatus, except for the vibration proof structure. Namely, in the figure, the reference numeral 11 denotes magnetic disk; 12, magnetic head; 13, head arm; 14, enclosure; 15a, 15b, 15c, vibration proof material such as rubber (isolation rubber) as the vibration proof supporting member (suspension member); 16, frame; 17, spindle center; 18, track of disk; 19, center of rotating axis of rotary actuator; 20, gravity center of enclosure. L1–L5, distance from gravity center 20; $r_{pos}$, distance from center of rotating axis 19 of actuator to gap of magnetic head 12.

Various components of the magnetic disk apparatus including magnetic disk 11, a driver such as spindle motor (not illustrated) for driving the disk, a magnetic head 12 and a rotary actuator (not illustrated) for positioning the head to the designated track 18 are provided within the enclosure 14 and define a center of gravity 20, of the enclosure and the aforesaid components. In addition, three vibration proof members 15a~15c are provided between the enclosure 14 and frame 16.

This vibration proof member 15a has the spring constants of ks for X direction and kc for Y direction and is located in the position L1 for X direction and L3 for Y direction relatively to the center gravity 20. The vibration proof member 15b has the spring constants of kc for X direction and ks for Y direction and is located in the position L2 for X direction and L5 for Y direction relatively to the gravity center gravity 20. The vibration proof member 15c has the spring constants of ks in the X direction and kc in the Y direction and is located in the position L1 for X direction and L4 for Y direction relatively to the center of gravity 20.

The distances L1–L5 as to the disposition of vibration proof members 15a~15c relatively to the gravity center 20 of enclosure 14 and respective spring constants ks, kc of the vibration free members 15a~15c are selected to satisfy the following two formulas.

$$L1 \cdot kc + L1 \cdot kc - L2 \cdot ks = 0 \quad (1)$$

$$L3 \cdot ks + L5 \cdot kc - L4 \cdot ks = 0 \quad (2)$$

Thereby, the linear moment around the gravity center 20 can be balanced for the external vibration inputs in the X and Y directions. Accordingly, a rotating movement force component, or moment, is no longer generated in the enclosure 14 and positioning error $\epsilon_0$ (FIG. 3B) is not generated.

Figure 5:
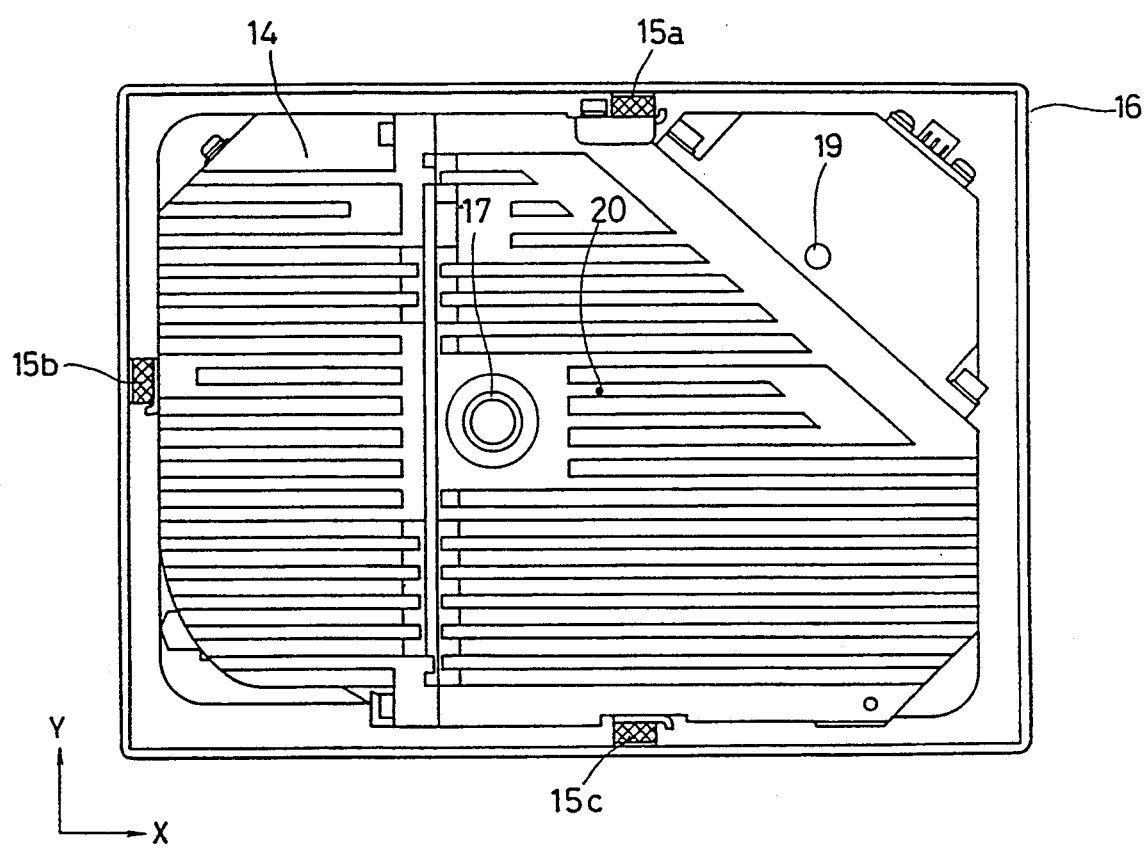

FIG. 5 is a plan view indicating in detail the first embodiment. The numerals that are the same as those in FIG. 4 indicate the same members. The three vibration proof members 15a–15c have the spring constants kc in the compressing direction and ks in the shearing direction and are fitted in such a way as being held by the two metal plates. Moreover, the fitting positions thereof between the enclosure 14 and frame 16 are selected as explained above so that the linear moment around the gravity center 20 of enclosure 14 is balanced. Therefore, as explained in regard to FIG. 4, a rotating moment is not generated in the enclosure 14 in response to an external vibration input and positioning error $\epsilon_0$ is no longer generated.

The vibration proof member is fixed to the metal plate, for example, by burning the rubber at the time of vulcanization or by using bonding agent. The one metal plate is fixed to the enclosure 14 by threading and the other metal plate to the frame 16 by threading.

Figure 6:
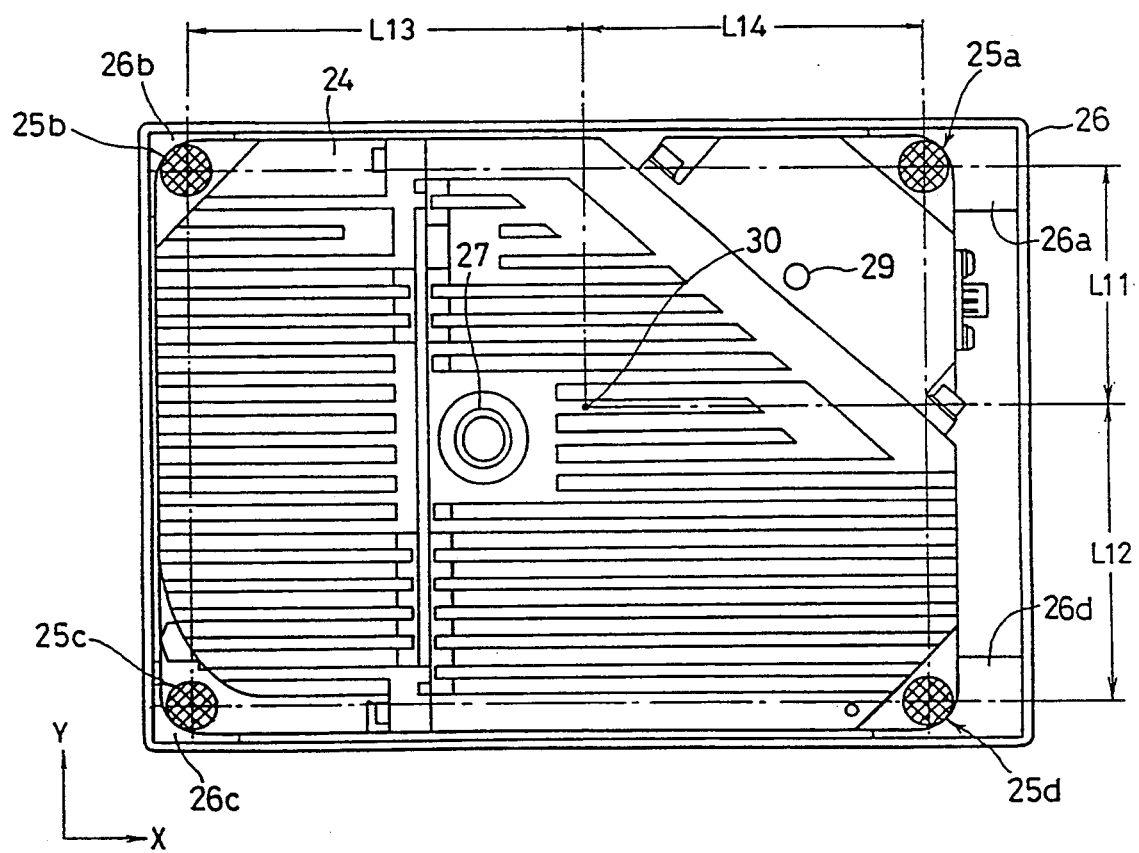
FIG. 6 is a plan view indicating a modification of a magnetic disk storage apparatus of the present invention.

FIG. 6 is a plan view of the second embodiment of the present invention. In this figure, the enclosure 24 is attached to fitting portions 26a~26d at the four corners of frame 26 through four vibration proof members 25a~25d. In this case, the reference numeral 27 denotes center of spindle; 29, center of rotating axis of rotary actuator; 30, gravity center of enclosure 24.

The vibration proof member 25a has the spring constant ka in X and Y directions and is located in the position L14 for X direction and L11 for Y direction relatively to the gravity center 30 of enclosure 24. The vibration proof member 25b has the spring constant kb in X and Y directions and is located in the position L13 for X direction and L11 for Y direction relatively to the gravity center 30 of enclosure 24. The vibration proof member 25c has the spring constant kc in X and Y directions and is located in the position L13 for X direction and L12 for Y direction relatively to the gravity center 30 of enclosure 24. The vibration proof member 25d has the spring constant kd in X and Y directions and is located in L14 for X direction and L12 for Y direction relatively to the gravity center 30 of enclosure 24. In short, the four vibration proof members 25a~25d are provided by selecting the spring constants ka kd and distances L11~L14 to satisfy the following conditions, $$L11 \cdot ka + L11 \cdot kb - L12 \cdot kc - L12 \cdot kd = 0 \quad (3)$$

$$L14 \cdot ka + L14 \cdot kd - L13 \cdot kb - L13 \cdot kc = 0 \quad (4)$$

in order to take balance of linear moment around the gravity center 30 of enclosure.

In the case of supporting the rigid body by the n (number) springs in the two dimensional co-ordinate having a gravity center in the position of (0, 0), above relationships can be generalized using the expression $$\Sigma K_{xi} \cdot Y_i = 0, \Sigma K_{yi} \cdot x_i = 0.$$

Wherein the co-ordinate $(X_i, Y_i)$ represents the position of the i number's spring, and each of $Kx_i$, $Ky_i$ respectively represents the spring constant in the direction of X and Y.

With such four vibration proof members 25a~25d, the enclosure 24 can be supported by the frame 26 in such a manner that any rotation moment M is not generated by the enclosure 24 in response to an external vibration input. Therefore, the head positioning error $\epsilon_0$ is no longer generated.

In case the position where the enclosure 24 is fitted to the frame 26 is predetermined in this embodiment, the linear moment around the gravity center 30 of enclosure 24 can be balanced against external vibration input by selecting the spring constants ka kd of the vibration proof members 25a~25d.

According to above two embodiments, the rotating movement of enclosure can be suppressed by a simplified vibration proof mechanism including a plurality of vibration proof members.

The present invention is not limited to only the embodiments explained above and allows various changes or modifications. For instance, the vibration proof supporting member can be formed not only by vibration rubber but can also use an attenuator such as damper. Moreover, it is also possible to reduce or increase a number of such elements. It is further possible, as in the following modification, to use different kinds of vibration proof supporting members.

Namely, a vibration proof mechanism can also be structured by a combination of vibration proof members in different temperature characteristics of the damping characteristic.

Figure 7:
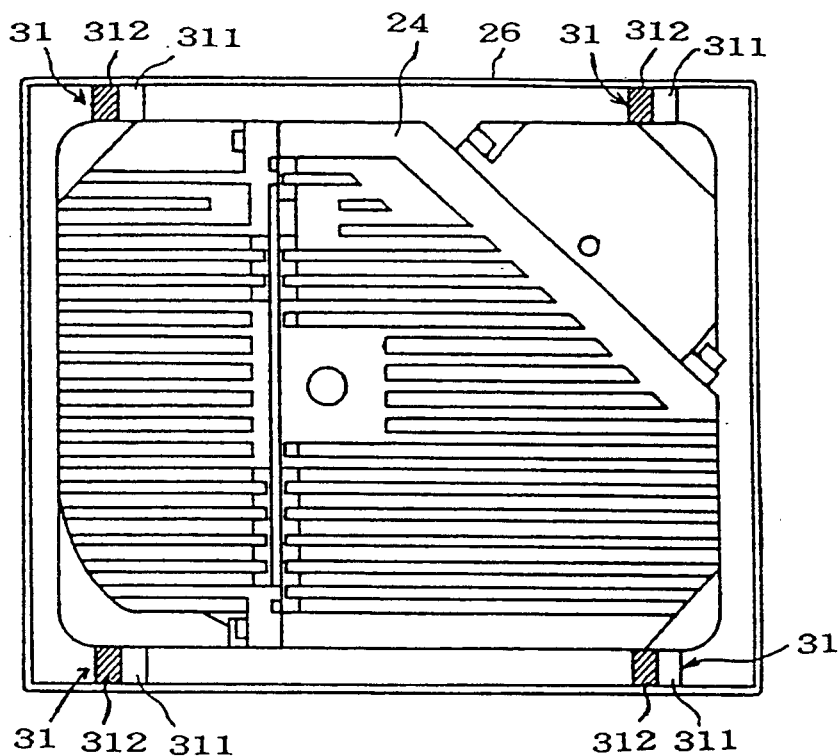
FIG. 7 and FIG. 8 are plan views indicating other modification examples of the present invention modifying vibration proof material.

FIG. 7 shows an embodiment wherein a vibration proof mechanism is formed by bonding a rubber 311 having good damping characteristic in low temperature within the operating temperature range and a rubber 312 having good damping characteristic in high temperature with a bonding agent to form a vibration proof member 31 and the enclosure 24 is supported by the frame 26 through the vibration proof members.

Therefore, according to this modification, the enclosure 24 can be supported by good damping characteristic of the rubber 311 and when the ambient temperature rises up to a higher range of the operating temperature range, the enclosure 24 can be supported by the good damping characteristics of rubber 312. Therefore, the anti-disturbance characteristic of enclosure 24 can be improved for a wider temperature range and any reduction of the positioning accuracy of magnetic head can be prevented. Moreover, selection of thickness of each member 311, 312 equalizes the damping characteristic in each temperature within the operation temperature range.

Figure 8:
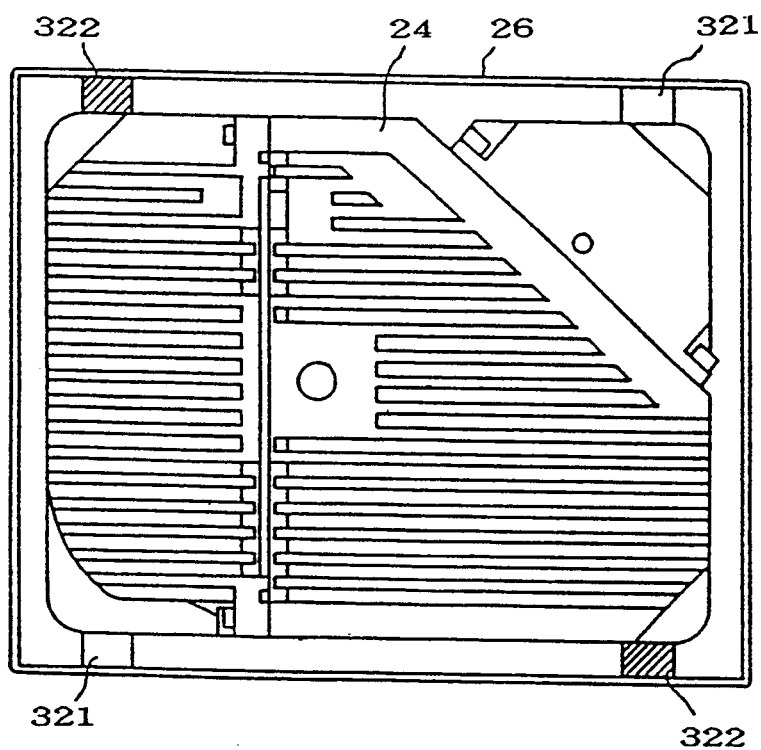

FIG. 8 shows another modification of a vibration proof mechanism wherein the enclosure 24 is supported by the frame 26 through a vibration proof member 321 having good damping characteristic in low temperature within the operating temperature range and a vibration proof member 322 having good damping characteristic in high temperature. According to this modification, since the enclosure 24 can be supported by good damping characteristic of vibration proof member 321 in low temperature within the operating temperature range, while by good damping characteristic of vibration proof member 322 in high temperature, the anti-disturbance characteristic of enclosure 24 can be improved for wider temperature range like the modification shown in FIG. 7.

Figure 9:
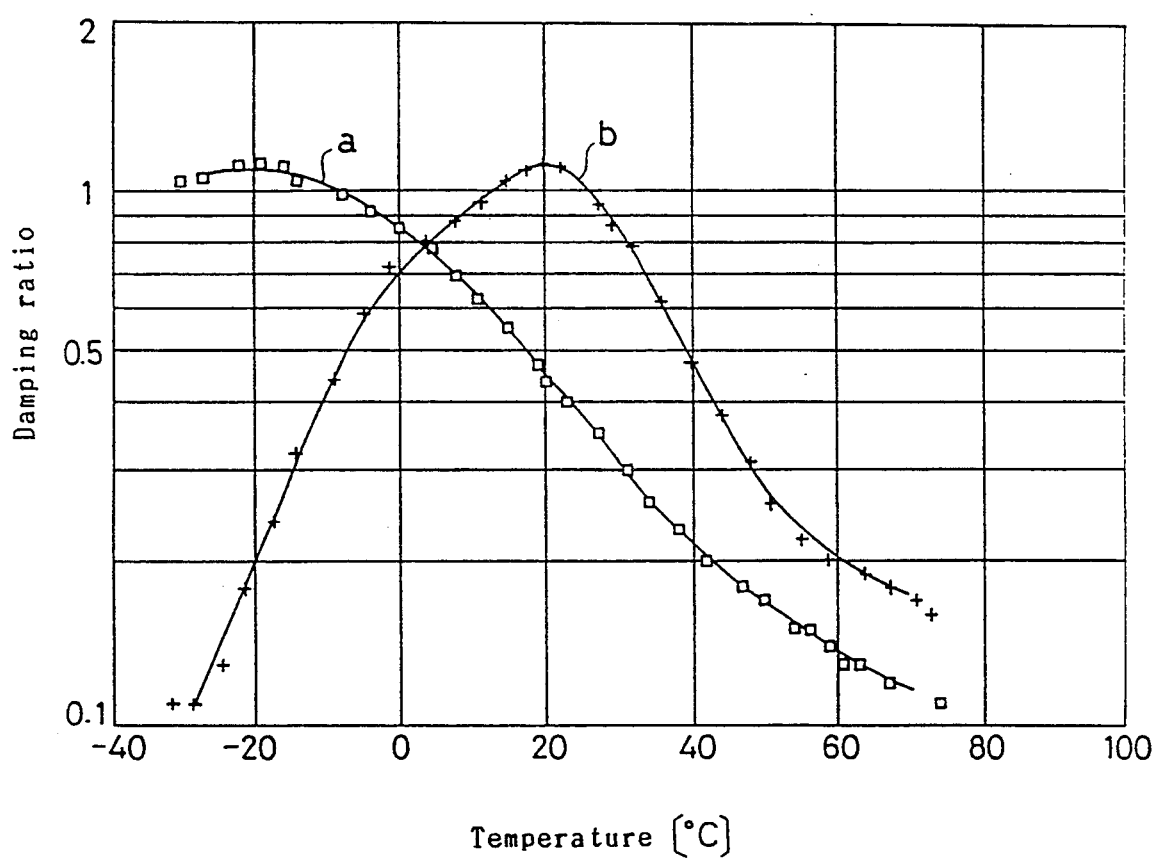
FIG. 9 and FIG. 10 are temperature characteristic curves of loss factor of vibration proof material shown in FIG. 7 and FIG. 8.
Figure 10:
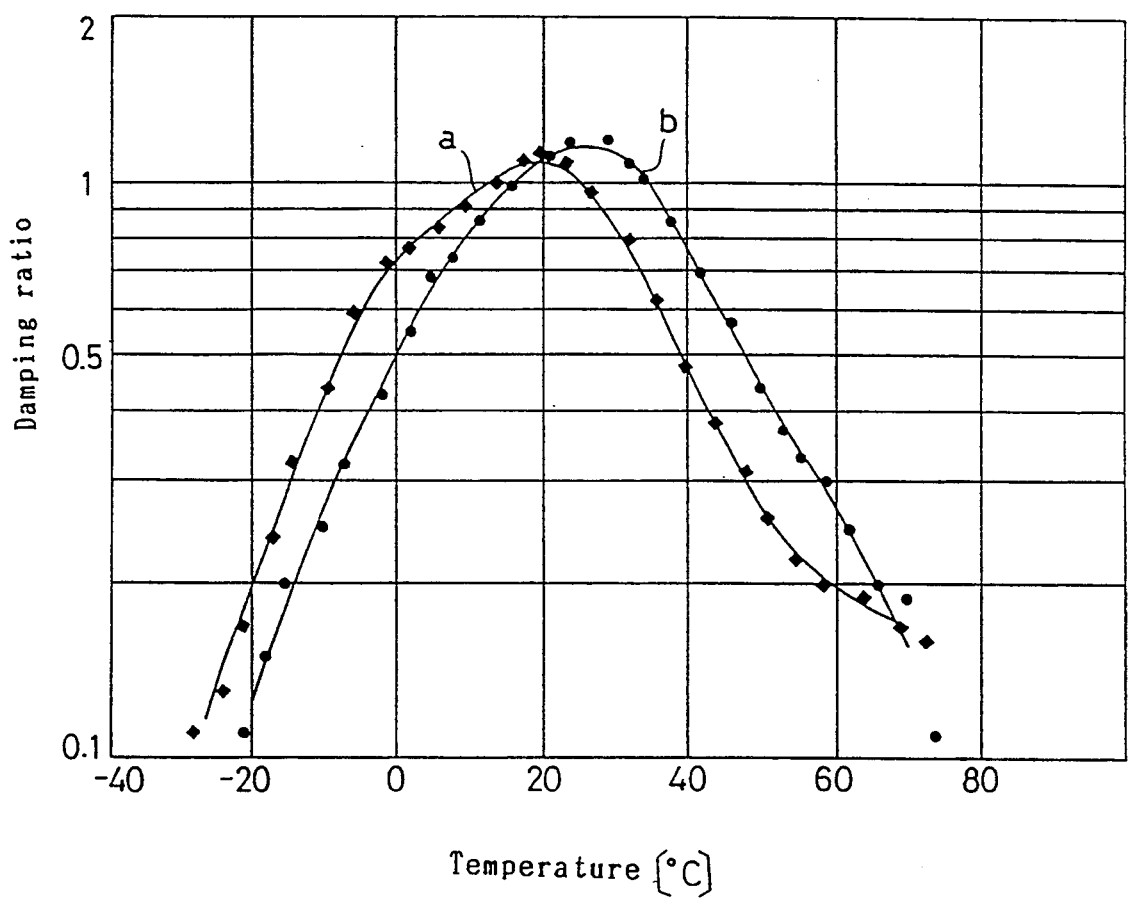

FIG. 9 and FIG. 10 respectively show temperature characteristic of loss factor of rubber in different materials. For instance, a curve a of FIG. 9 shows temperature characteristic of buthyl rubber as the material which shows the maximum loss factor at $-20°$ C., while a curve b shows temperature characteristic of a thermoplastic resin, for example, SOFTOPPER (brand name) as the material which shows the maximum loss factor at $+20°$ C. The anti-disturbance characteristic of enclosure 24 can be improved for the temperature range of $-40°$ C. to $+40°$ C. by using such materials for the members 311 (321), 312 (322) of the embodiments shown in FIG. 7 and FIG. 8.

Moreover, a curve a of FIG. 10 shows the temperature characteristic of thermoplastic resin SOFTOPPER (brand name by BRIDEGESTONE) as the material which shows the maximum attenuation ratio at 20° C., while a curve b shows the temperature characteristic of a thermoplastic resin, for example, H-1 SOFTOPPER (brand name) as the material which shows the maximum loss factor at 30° C. The anti-disturbance characteristic of enclosure 24 can be improved for the temperature range of 0° C.~40° C. by using such materials as the members 311 (321), 312 (322) in the modifications explained above.

For the vibration proof members in each modification explained above, the ISODAMP (brand name by EAR) composed of polymer compound material based on elastomer agent or the SORBOSEIN (brand name) composed of ether polyulethane adding reinforcing agent and thermosetting agent to the base of polyole and MDI can be used. Moreover, some materials have the temperature characteristics of 13°~40° C., 27°~55° C. and 35°~63° C., etc. as the optimum operating temperature. Therefore, it is also possible, like the embodiments explained above, to combine three or more kinds of materials in different temperature characteristics other than combination of two kinds of materials. In this case, the anti-disturbance characteristic in the wider temperature range can further be improved.

Other two expansion examples which ensure further vibration proof effect with combination of such embodiments explained above will be explained hereunder.

As a first expansion example, a vibration proof structure for reducing positioning error generated by rotating movement of an enclosure due to vibration caused by repulsion, so-called seek reaction force applied on the enclosure when the magnetic head is moved at a high speed has been proposed.

The rigidity of the vibration proof supporting member must be set high (high resonance point of vibration proof supporting system including vibration proof supporting member) in order to suppress the rotating movement itself of the enclosure by such seek reaction force. However, a problem is generated in that a greater part of vibration produced by an external disturbance is not attenuated and instead is transferred to the enclosure.

Therefore, a vibration proof supporting system, which allows to a certain degree the rotating movement of the enclosure itself but sufficiently reduces positioning error, is considered here. As will be explained later, the relationship between positioning error and seek reaction force is analyzed including the servo characteristic with the resonant point of the vibration proof supporting system considered as a variable. From this analysis, it can be understood that a region where positioning error becomes small exists between the smaller region and larger region of a certain value of the resonance frequency of the vibration proof supporting system. When the resonance frequency is set to a lower side, the positioning error can also be set small and thereby influence of disturbance can be made small. If the resonance frequency is set to the lower region, the relative vibration amplitude of the enclosure and frame becomes large for seek reaction force or external disturbance and the enclosure makes contact with the frame, in the worst case. However, if the distance between the enclosure and frame is set large, a problem that the apparatus becomes large in size is generated.

Therefore, in the first expansion example, the vibration proof effect is improved by setting the following relationship between the servo band width of the servo control system for controlling the rotary actuator and the resonance frequency of the supporting system including the vibration proof supporting member. Namely the resonance frequency of supporting system is set to a value at least outside of range $1/5 \sim \frac{1}{4}$. Here the servo band width means the frequency where the open loop gain becomes 0 dB.

An embodiment will be explained in detail with reference to FIG. 11 to FIG. 15.

Figure 11:
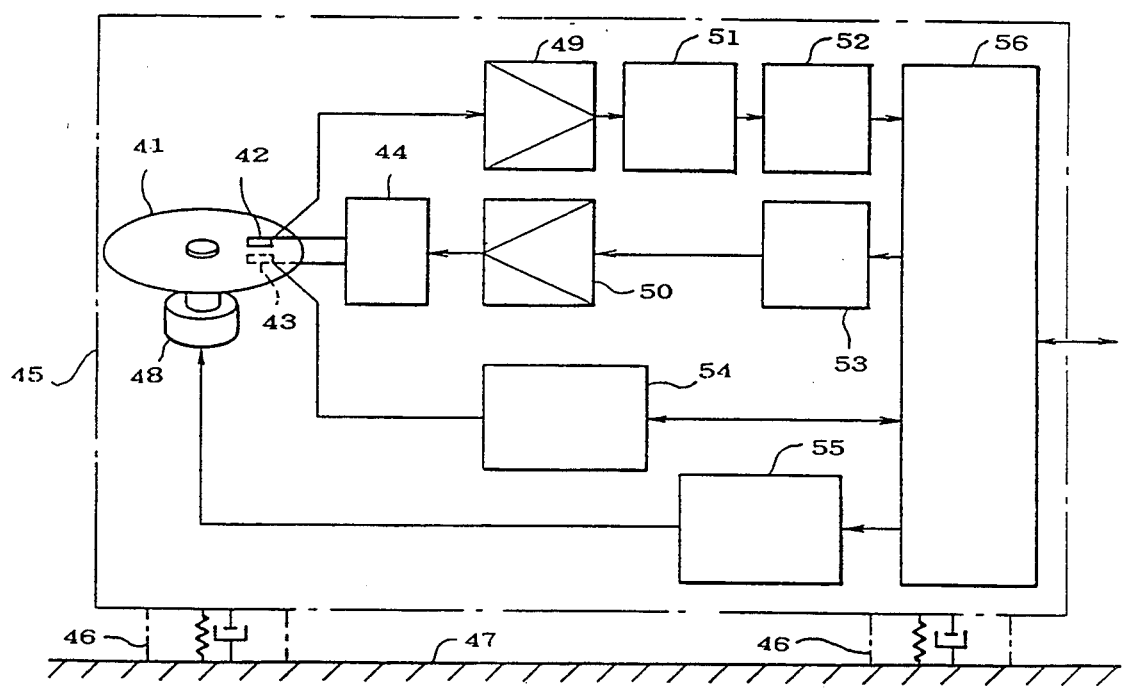
FIG. 11 and FIG. 12 are diagrams for explaining other modification examples of the magnetic disk storage apparatus of the present invention.

FIG. 11 schematically shows the mutual relationship among the disk rotating system, head positioning system, servo control system and enclosure supporting system. In this figure, the reference numeral 41 denotes magnetic disk; 42, servo head; 43, data head; 44, rotary actuator consisting of voice coil motor; 45, enclosure; 46, vibration proof supporting member; 47, frame; 48, spindle motor; 49, 50, amplifier; 51, demodulator for demodulating servo signal; 52, A/D converter; 53, D/A converter; 54, read/write control circuit; 55, motor control circuit; 56, main controller consisting of microprocessor, etc. The above electric circuits are indicated as being provided within the enclosure but the greater part of them is actually provided outside the enclosure.

The servo control system is formed by the closed loop of the servo head 42—amplifier 49—demodulator 51—A/D converter 52—main controller 56—D/A converter 53—amplifier 50—rotary actuator 44. However, since the functions of this system are already known it is not explained because it is not related directly to the present invention. The vibration proof supporting member 46 can be indicated by an equivalent circuit including spring constants and attenuation constants. The supporting system including this vibration proof supporting member 46 has the resonance frequency $f_{sus}$. Moreover, since this resonance frequency of the supporting system (resonance point of supporting system) utilizes the rotary actuator 44, the rotating resonance point becomes a problem.

Figure 12:
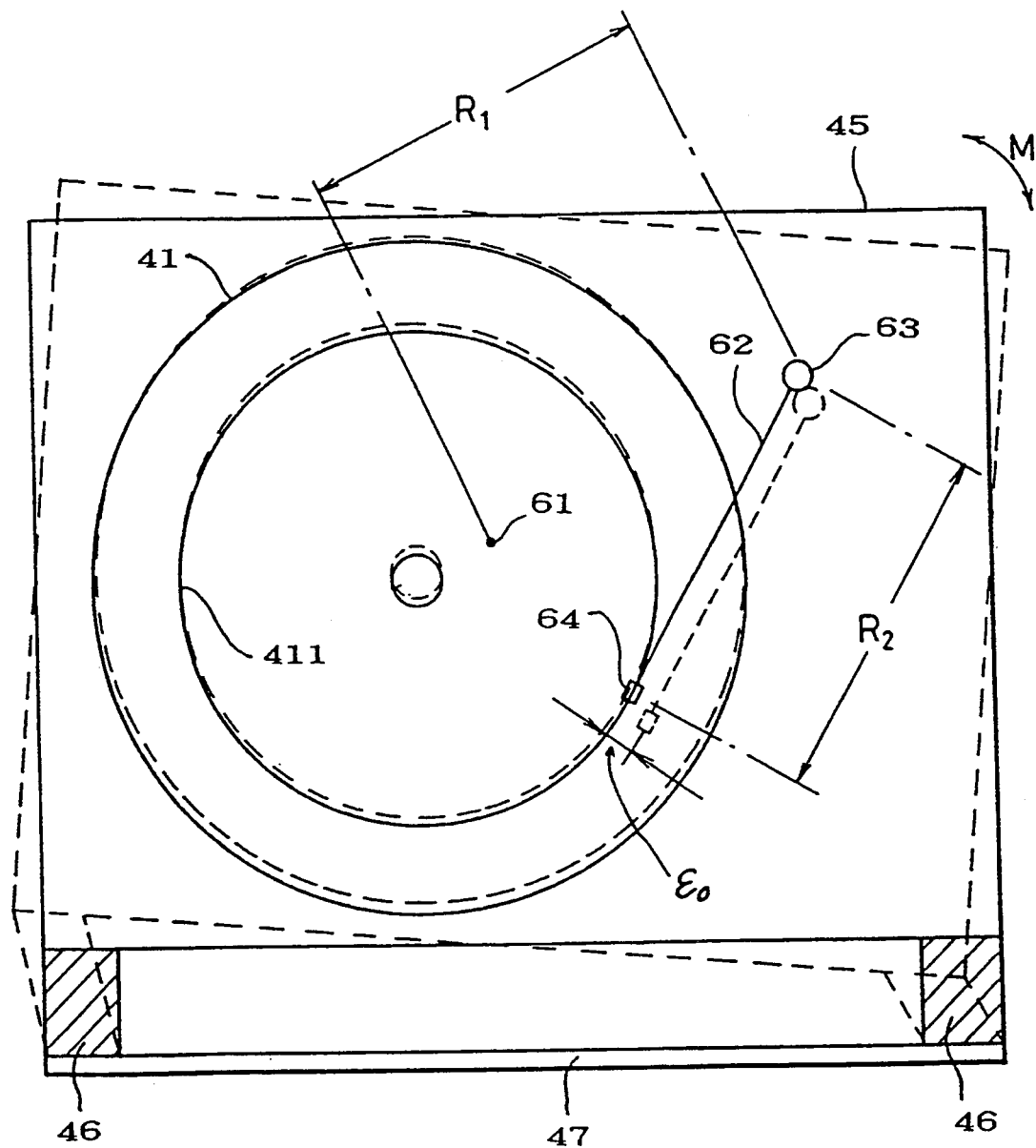

FIG. 12 is a diagram for explaining relative displacement between disk and head due to vibration of enclosure generated by seek reaction force. When high speed seek operation is repeated by the rotary actuator 44 under the condition that the frame 47 is fixed, the enclosure 45 is vibrated as indicated by the arrow mark by the rotating moment M due to the seek reaction force. Such vibration generates rotating movement of the enclosure 45 like the external translational vibration. Therefore, when the positioning control is not conducted by the servo control system, the magnetic disk 41 is displaced, together with the enclosure, to the dotted line position from the solid line position around the gravity center 61 and the head arm 62 only makes translational operation for displacement of rotation center 63. Thereby the magnetic head 64 (42, 43) and track of the magnetic disk 41 are relatively displaced in the radius direction only by $\epsilon_0$. However, in actual, since the positioning control is carried out by the servo control system, relative displacement $\epsilon_0$ can be suppressed. This relative displacement corresponds to positioning error. Relationship between the resonance frequency $f_{sus}$ of the supporting system including the vibration proof supporting member 46 and relative displacement $\epsilon_0$ can be expressed by the following formula and it is also shown in FIG. 13.

$$20 \log \epsilon_o = 20 \log \left( \frac{J_{POS}}{J_{DE}} \cdot \frac{R_1}{R_2} \cdot \frac{a_{max}}{8 \pi^2 \zeta} \right) - 40 \log f_{sus} \text{ (dB)} \quad (5)$$

Where, $J_{pos}$: inertia moment of rotary actuator, $J_{DE}$: inertia moment of enclosure (not including actuator), $a_{max}$: maximum acceleration of head, $\zeta$: damping ratio of vibration proof supporting member, $R_1$, $R_2$: distance shown in FIG. 12.

In general $(J_{pos}/J_{DE}) \cdot (R_1/R_2)$ is about $1/400 \sim 1/100$, $a_{max}$ is about $10 \sim 100$ G and $\zeta$ is about $0.05 \sim 0.1$.

The resonance frequency of the supporting system and relative displacement in FIG. 13 are in the linear relation when the resonance frequency of supporting system $f_{sus}$ [Hz] is plotted on the horizontal axis (logarithmic scale), while relative displacement $\epsilon_0$ [μm] is plotted on the vertical axis (dB scale). This result means that when the vibration proof supporting member 46 is formed by a comparatively hard rubber to set the resonance frequency of supporting system $f_{sus}$ to a higher area, vibration amplitude becomes smaller and relative displacement $\epsilon_0$ becomes small. When the vibration proof supporting member 15 is formed by a comparatively soft rubber, on the contrary, to set the resonance frequency of supporting system $f_{sus}$ to a higher area, vibration amplitude becomes large and relative displacement $\epsilon_0$ also becomes large.

The relationship between the servo band width of the servo control system including the rotary actuator 44 and tracking error rate by servo control system is shown, for example, in FIG. 14. Namely, when the servo band width [Hz] is plotted on the horizontal axis (logarithmic scale) and the tracking error rate [dB] is plotted on the vertical axis, the servo band width $f_0$ extends up to the maximum gain MP which results in the minimum tracking error rate.

When the resonance frequency $f_{sus}$ of the supporting system is set depending on the characteristic of vibration proof supporting member 46 such as rubber, the vibration rotating angle of enclosure in the worst case where the rotating vibration frequency $f_s$ matches the resonance frequency $f_{sus}$ of supporting system is determined and the relative displacement $\epsilon_0$ in the current track position of the magnetic head 64 (42, 43) is determined from FIG. 13 from the geometrical conditions. Therefore, when a product of relative displacement $\epsilon_0$ and tracking error ratio is plotted with the resonance frequency $f_{sus}$ [Hz] of supporting system on the horizontal axis (logarithmic scale) and positioning error [%] normalized with the maximum positional deviation for reading or writing information (offset margin: 10~15% of ordinary track pitch). Thereby, the related curve shown in FIG. 15 can be obtained. Namely, it has been proved that the maximum value of positioning error is generated in the range of ¼~1/5 of the servo band width $f_0$ of the servo control system. When the servo band width $f_0$ is widened, the peak of positioning error shifts to the right side.

A value of $f_{sus}$ which gives the maximum positioning error changes depending on the tracking error characteristic shown in FIG. 14. But since the maximal gain $M_p$ in the servo control system is limited to narrow range by the rule of experience ($M_p$ rule), the shape of the characteristic curve is substantially determined uniquely by the servo band width and the positioning error becomes worst in the range of $f_0/5 \sim f_0/4$.

Figure 15:
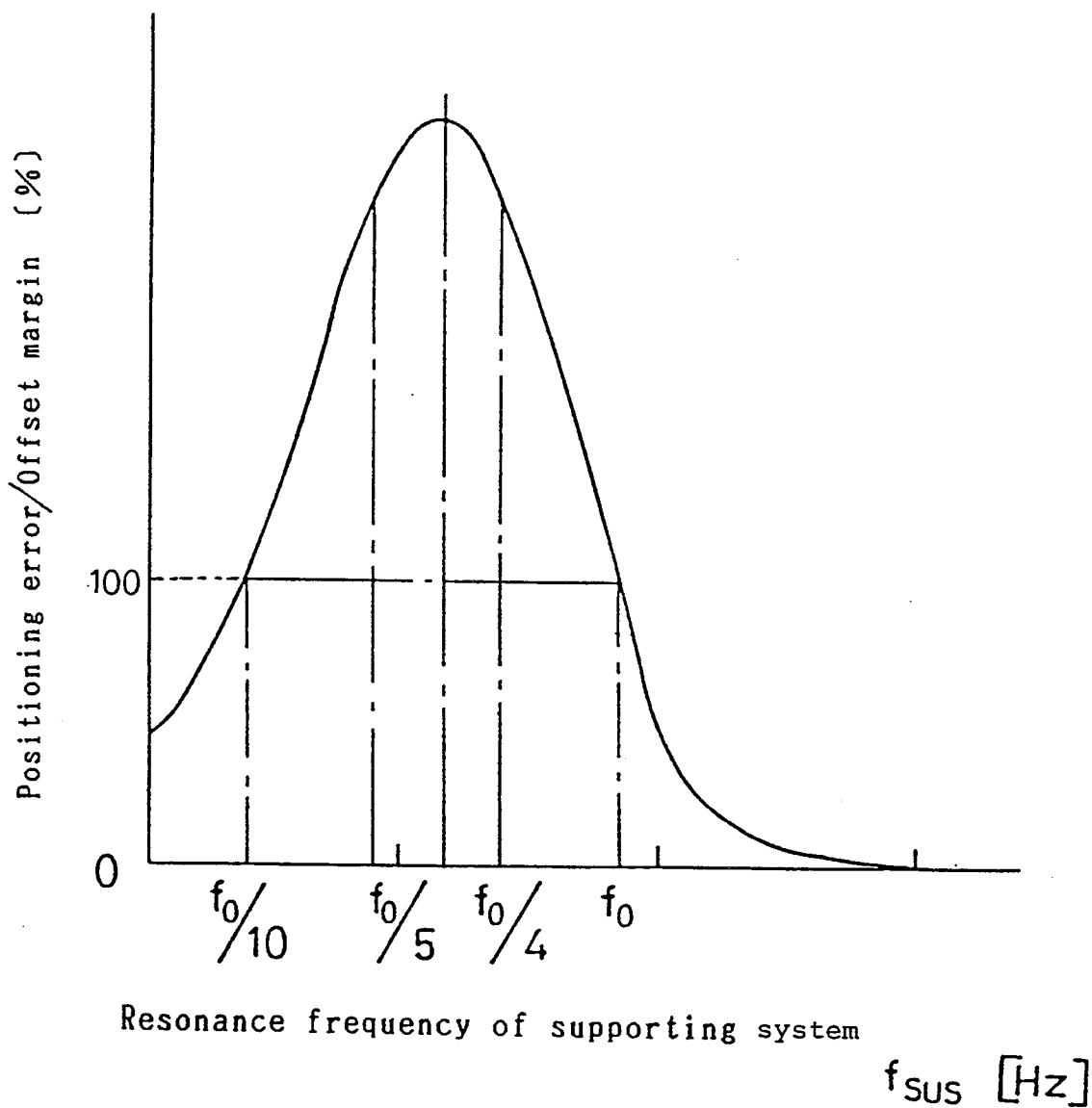
FIG. 15 indicates the characteristic curves of positioning error/offset margin and resonance frequency of the supporting system in FIG. 11.

As shown in FIG. 15, it is enough that the resonance frequency $f_{sus}$ of supporting system including the vibration proof supporting member 46 is set outside the range of 1/5~¼ of the servo band width $f_0$. In practical, when a margin is considered to high frequency vibration resulting to thermal offtrack and structure system for the offset margin ensuring read and write operation, the allowable positioning error for vibration discussed here is about 40% for the offset margin. It can be satisfied by setting $f_{sus}$ to the range lower than $f_0/10$ or higher than $f_0$. Thereby, the necessary positioning accuracy can be acquired without excessively lowering the resonance frequency of the supporting system.

When it is desired to have only a small distance between the enclosure 45 and frame 47, it can be satisfied by the setting of $f_{sus} > f_0$.

Therefore, according to the first expansion example described above, the vibration proof effect can be improved for vibration resulting from external force and seek reaction force without excessively lowering the resonance frequency of the supporting system including the vibration proof supporting member. As a result, the distance between the enclosure and frame can be narrowed, resulting in the merit that the apparatus itself can be reduced in size.

Next, as the second expansion example, a vibration proof structure is proposed. This structure does not generate rotating movement in the enclosure even when a little unbalance in rotation is generated in the magnetic disk or spindle.

Figure 16:
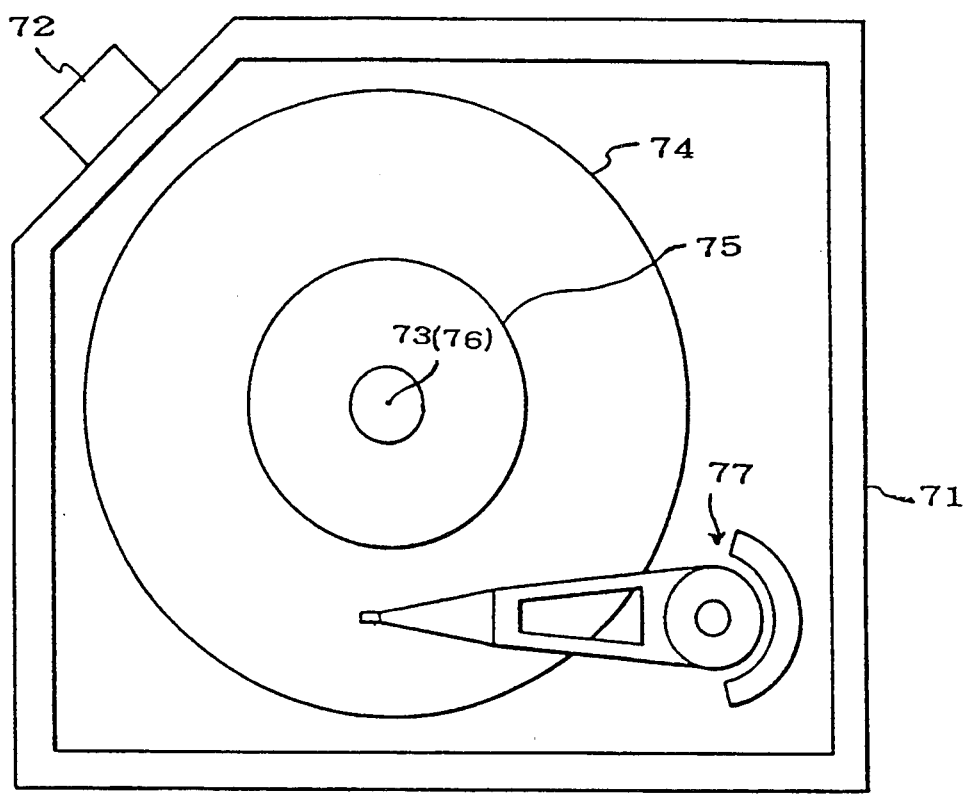
Figure 17:
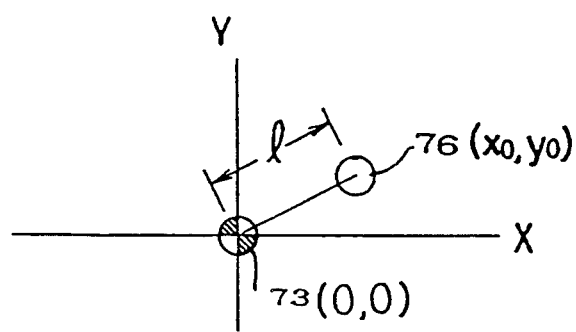

Namely, high speed rotation of disk is essential for high speed data transfer and therefore even if a little unbalance exists in rotation of disk and spindle in the apparatus where the disk is rotating at a high speed, vibration of enclosure becomes distinctive, generating the rotating movement component in the enclosure. Accordingly, the second expansion example of the present invention suppresses rotating movement of the enclosure, resulting from unbalance in rotation of the disk rotating system through matching of the gravity center (i.e., center of gravity) 73 of enclosure 71 and the rotation center 76 of spindle 75 of disk 74 by attaching a weight 72 to the enclosure as shown in FIG. 16. The principle for not generating rotating movement in the enclosure 71 when the gravity center 73 of enclosure 71 matches the rotating center 76 of spindle 75 will be explained with reference to FIG. 17. Namely in FIG. 17, the gravity center 73 of enclosure is separated by the distance l from the rotation center 76 of spindle 75. The gravity center 73 of enclosure 71 is set as the origin of coordinates. The rotation center 76 of spindle is given the coordinates $(x_0, y_0)$, unbalance of rotation of spindle 75 is considered as $\rho$, and angular velocity of spindle 75 is defined as $\omega$. In this case, a force F indicated by the formula $$F = \rho \omega^2 \qquad (6)$$

is applied to the spindle 75 due to unbalance of rotation. This force F is a translational force for the rotation center 76 of spindle 75 and its direction changes depending on rotation of spindle 75. Namely, the following forces are applied in the directions of X axis and Y axis in the plane vertical to the axis of spindle 75.

$$F_x = F \cos \omega t \qquad (7)$$

$$F_y = F \sin \omega t \qquad (8)$$

The torque T, indicated by the following formula, is exerted on the axis passing through the gravity center 73 and parallel to the axis of spindle 75 and wherein the translational forces $F_x$, $F_y$ are applied to the gravity center 73 (0,0) of enclosure 71.

$$\begin{aligned} T &= x_0 F_y - y_0 F_x \\ &= F(x_0 \sin t - y_0 \cos t) \\ &= Fl \sin(\omega t + \phi) \end{aligned} \qquad (9)$$

Where,

-continued $$l = \sqrt{(x_0^2 + y_0)^2}$$

$$\phi = \tan^{-1}(-y_0/x_0)$$

In case the periphery of enclosure 71 is supported freely, when a mass of enclosure 71 is m, an inertia moment around the axis passing through the gravity center 73 and is parallel to the spindle 75 J, displacement ($x_G$, $y_G$) of gravity center and rotating angle Θ are determined as follows.

$$x_G = -F_x/(m\omega^2) \qquad (10)$$
$$= -F(m\omega^2)\cos t$$
$$= -\rho/m \cos\omega t$$

$$y_G = -F_y/(m\omega^2) \qquad (11)$$
$$= -F(m\omega^2)\sin\omega t$$
$$= -\rho/m \sin\omega t$$

$$\theta = -T/(J\omega^2) \qquad (12)$$
$$= F/(J\omega^2)\sin(\omega t + \phi)$$
$$= -\rho l/J \sin(\omega t + \phi)$$

That is, the gravity center 73 undergoes a circular motion with angular velocity ω and radius ρ/m and also undergoes a rotating movement with the swing angle of 2ρl/J. Therefore, a rotating movement is generated in the enclosure 71 and thereby head positioning error as explained previously is generated. Therefore, in the second expansion example of the present invention, the rotating angle Θ in the formula (12) is set to zero when l=0. This distance l can be set easily to zero in the design stage. Namely, the gravity center 73 of enclosure 71 is matched with the rotation center 76 of the spindle 75 by fitting a weight 72.

It is also possible that the gravity center of enclosure 71 is matched with the rotation center 76 of spindle 75 with a structure such that the side wall of enclosure 71 in the opposite side to the rotary actuator 77 is formed thick. In this case, a weight 72 may be omitted.

According to the second expansion of the present invention, economical and high precision positioning can be conducted without adjustment of the balance of the spindle during operation and moreover part cost and man-hour of assembling can drastically be reduced. Accordingly this expansion provides the advantage that small size, large capacity and high speed magnetic disk storage apparatus can realize remarkable cost reduction. Therefore, in combination with the first expansion, a vibration free structure having excellent performance and economical advantage can be obtained. It is of course possible to solely utilize this expansion.

Moreover, as the other modification of the present invention, a vibration proof structure providing double frame and a plurality of vibration proof supporting members between the frames and between enclosure and frame has been proposed. FIG. 18 shows a plan view of a magnetic disk storage apparatus conforming to such modification. As shown in this figure, an intermediate frame 83 is provided between the enclosure 81 and external frame 82. The four vibration proof members 84-87 are provided in the four corners in the interval between the external frame 82 and intermediate frame 83 and four vibration proof members 88-91 are also provided between the intermediate frame 83 and enclosure 81. The two pairs of vibration proof members consisting of four members 84~87, 88~91 are flexible in the shearing direction and are hard in the compressing direction. According to the vibration proof mechanism as explained above, the enclosure 81 is flexibly supported in the X direction for the intermediate frame 83 and in the Y direction for the external frame 82. Moreover, the enclosure 81 is supported very rigidly in the rotating direction. Therefore, the rotating movement of enclosure can be suppressed for vibration produced by seek reaction force as well as by the external translational vibration input. As a result, relative displacement between the head and disk can be prevented.

The present invention is limited only within the scope of the claims.

What is claimed is:

1. A magnetic disk storage apparatus, comprising:
   an enclosure housing plural components of said magnetic disk storage apparatus and having a center of gravity, said plural components comprising:
   at least one magnetic disk having a recording surface and plural tracks at corresponding positions on the recording surface,
   rotating drive means for rotating said at least one magnetic disk,
   a magnetic head, and
   a rotary actuator for positioning said magnetic head to a designated track on the recording surface of said at least one magnetic disk;
   a frame surrounding and holding said enclosure;
   a plurality of (i) vibration proof supporting members provided between said frame and said enclosure so as to balance a linear moment around the center of gravity of said enclosure resultant from a translational vibration input to the frame in a plane perpendicular to the axis of rotation of said at least one magnetic disk, and thereby to prevent said translational vibration input from producing rotational displacement of said enclosure relative to an initial, rest position thereof; and
   said enclosure and said vibration proof supporting members, in the initial, rest position of said enclosure, are related in an X-Y coordinate system wherein, when:
   the center of gravity of the enclosure is located at the origin (X=0, Y=0) of the coordinate system,
   i≧3,
   Xi, Yi is the position of the $i^{th}$ vibration proof supporting member in the X-Y coordinate system and, thus, relative to the origin of the X-Y coordinate system, and
   $K_{xi}$ and $K_{yi}$ are the spring constants of the $i^{th}$ vibration proof supporting member, respectively in the X-direction and Y-direction of the X-Y coordinate system, then:

$\rho K_{xi} Y_i = 0$, $\Sigma K_{yi} X_i = 0$.

2. A magnetic disk storage apparatus according to claim 1, wherein
   said at least one magnetic disk has a center, and
   wherein said magnetic disk storage apparatus further includes a spindle having a center of rotation for supporting said at least one magnetic disk, and wherein the center of rotation of said spindle supporting the center of said at least one magnetic disk matches the center of gravity of said enclosure.

3. A magnetic disk storage apparatus according to claim 2, wherein said vibration proof supporting members comprise an elastic material.

4. A magnetic disk storage apparatus according to claim 3, wherein each of said vibration proof supporting members is made of vibration proof rubber.

5. A magnetic disk storage apparatus according to claim 4, wherein each of said vibration proof rubber comprises a plurality of rubber materials having different damping characteristics for temperature.

6. A magnetic disk storage apparatus according to claim 1, wherein each of said plurality of vibration proof supporting members comprises an elastic material.

7. A magnetic disk storage apparatus according to claim 6, wherein each of said vibration proof supporting members is made of vibration proof rubber.

8. A magnetic disk storage apparatus according to claim 7, further comprising pairs of vibration proof rubber, each pair having different damping and temperature characteristics.

9. A magnetic disk storage apparatus according to claim 7, wherein each of said vibration proof rubber comprise a plurality of rubber materials having different damping characteristics for a temperature.

10. A magnetic disk storage apparatus, comprising:
at least one magnetic disk having an axis of rotation;
an enclosure containing said at least one magnetic disk and having a center of gravity;
rotating drive means for rotating said at least one magnetic disk;
a magnetic head;
a rotary actuator for positioning said magnetic head to a designated track of said at least one magnetic disk;
a frame for holding said enclosure;
a plurality of vibration proof supporting members provided between said frame and said enclosure so as to balance linear moment around the center of gravity of said enclosure against a translational vibration input in a plane perpendicular to the axis of rotation of said at least one magnetic disk;
a servo control means, having a servo band width, for controlling positioning of said rotary actuator, and wherein
said plurality of vibration proof supporting members has a resonance frequency set outside at least a range of 1/5-¼ of the servo band width.

11. A magnetic disk storage apparatus according to claim 10, wherein the resonance frequency of said vibration proof supporting members is set to 1/10 or less of the servo band width.

12. A magnetic disk storage apparatus according to claim 10, wherein the resonance frequency of said vibration proof supporting members is set higher than servo band width.

13. A magnetic disk storage apparatus according to claim 10, wherein said vibration proof supporting members comprise an elastic material.

14. A magnetic disk storage apparatus according to claim 13, wherein each of said vibration proof supporting members is made of vibration proof rubber.

15. A magnetic disk storage apparatus according to claim 14, further comprising pairs of said vibration proof rubber, each pair having different temperature and damping characteristics.

16. A magnetic disk storage apparatus according to claim 14, further comprising pairs of said vibration proof rubber, each pair having different temperature and damping characteristics.

17. A magnetic disk storage apparatus according to claim 14, wherein each of said vibration proof rubber comprises a plurality of rubber materials having different damping characteristics for temperature.

18. A magnetic disk storage apparatus having a center of gravity, comprising:
(a) at least one magnetic disk having a center of rotation and an axis of rotation;
(b) a rotation drive mechanism positioned to rotate said at least one magnetic disk;
(c) a magnetic head for writing or reading data to or from a designated track of said magnetic disk;
(d) rotary actuator means, having a center of rotation, for positioning said magnetic head to the designated track of said magnetic disk and for supporting said magnetic head, and including a movable part rotatable through a determined angle relatively to the center of rotation of said rotary actuator means so as to match the center of gravity of said movable part to the center of rotation of the movable part of said rotary actuator means;
(e) servo control means, having a servo band width, for controlling the positioning of said rotary actuator;
(f) an enclosure;
(g) a frame surrounding and holding said enclosure; and
(h) a plurality of vibration proof supporting members which support said enclosure within said frame and are disposed between said enclosure and said frame at positions so that at least one of a moment around a center of gravity of said enclosure is balance and a translational vibration input applied to the frame in a plane perpendicular to the axis of rotation of said at least one magnetic disk and a resonance frequency of said vibration proof supporting members is set outside of the range of one-fifth to one-fourth of the servo band width.

19. A magnetic disk storage apparatus according to claim 18, wherein said vibration proof supporting members comprise an elastic material.

20. A magnetic disk storage apparatus according to claim 19, wherein each of said vibration proof supporting members is made of vibration proof rubber.

21. A magnetic disk storage apparatus according to claim 20, further comprising pairs of said vibration proof rubber, each pair having different temperature and damping characteristics.

22. A magnetic disk storage apparatus according to claim 20, wherein each of said vibration proof rubber comprises a plurality of rubber materials having different damping characteristics for temperature.

23. A magnetic disk storage apparatus according to claim 18, wherein the resonance frequency of said plurality of vibration proof supporting members is set to 1/10 or less of the servo band width.

24. A magnetic disk storage apparatus according to claim 18, wherein the resonance frequency of said plurality of vibration proof supporting members is set higher than the servo band width of servo control system.

25. A magnetic disk storage apparatus, comprising:

an enclosure housing plural components of said magnetic disk storage apparatus and having a center of gravity, said enclosure having a periphery and comprising a first pair of opposed sidewalls extending in a first direction and a second pair of opposed sidewalls extending in a second direction, different from the first direction, and interconnected at the respective ends thereof with corresponding, respective ends of the opposed, spaced sidewalls of the first pair thereby to define the periphery of said enclosure;

said plural components comprising:
- at least one magnetic disk having a recording surface and plural tracks on the recording surface and having an axis of rotation transverse to the recording surface,
- rotating drive means for rotating said at least one magnetic disk about the axis of rotation thereof,
- a magnetic head, and
- a rotary actuator for positioning said magnetic head to a designated track on the recording surface of said at least one magnetic disk;

a frame surrounding and holding said enclosure, said frame comprising an outer frame portion and an inner frame portion received within the outer frame portion, the inner frame portion having a periphery and comprising first and second pairs of opposed frame elements, corresponding to and disposed in spaced relationship with respect to the corresponding first and second pairs of sidewalls of said enclosure and interconnected at the respective, corresponding ends thereof to define the periphery of the inner frame portion and the outer frame portion having a periphery and comprising first and second pairs of opposed frame elements, corresponding to and disposed in spaced relationship with respect to the corresponding first and second pairs of opposed frame elements of the inner frame portion and interconnected at the respective, corresponding ends thereof to define the periphery of the outer frame portion, all of said respective, opposed sidewalls of said enclosure and of said frame elements of said outer and inner frame portions being perpendicular to the recording surface of said at least one magnetic disk; and a plurality of vibration proof supporting members provided between said frame and said enclosure so as to balance a linear moment around the center of gravity of said enclosure resultant from a translational vibration input to the frame in a plane perpendicular to the axis of rotation of said at least one magnetic disk, and thereby to prevent said translational vibration input from producing rotational displacement of said enclosure, said plurality of vibration proof supporting members further comprising:

a plurality of first vibration proof supporting members having inflexibility in the first direction and flexibility in a second direction, orthogonal to the first direction, and positioned, respectively and selectively, in the space between said enclosure side walls and said corresponding inner frame elements which extend in the second direction, and a plurality of second vibration proof supporting members having flexibility in the first direction and inflexibility in the second direction and positioned, respectively and selectively, in the spaces between said inner frame elements and said corresponding outer frame elements which extend in the first direction.

* * * * *

UNITED STATES PATENT AND TRADEMARK OFFICE
CERTIFICATE OF CORRECTION

PATENT NO. : 5,349,486
DATED : September 20, 1994
INVENTOR(S) : SUGIMOTO et al.

It is certified that error appears in the above-indentified patent and that said Letters Patent is hereby corrected as shown below:

Col. 2, line 59, change "portion" to --portions--.

* Col. 4, line 22, after "center" insert --of--;
* line 26, change "gravity center gravity" to --center of gravity--.

Col. 8, line 46, begin a new paragraph with "Relationship";
line 53, change the equation to read as follows (specifically, change all occurrences of "log" to --$\log$--):

$$20\log\varepsilon_0 = 20\log\left\{\frac{J_{POS}}{J_{DE}} \cdot \frac{R_1}{R_2} \cdot \frac{\alpha_{max}}{8\pi^2\zeta}\right\} - 40\log f_{sus} \, (dB)$$

Col. 10, line 35, change "1" to --$\ell$--;
line 65, change "Flsin($\omega t + \phi$)" to --F$\ell$sin($\omega t + \phi$)--.

Col. 11, line 3, change "l =" to --$\ell$ =--;
line 9, after "and" delete "is"; and after "75" insert --is--;
line 16, in equation (10), change "cost" to --cos$\omega$t--;
line 25, in equation (12), change "ρl/J" to --$\rho\ell$/J--;
line 29, change "2ρl/J" to --2$\rho\ell$/J--; and begin a new paragraph with "Therefore";
line 32, begin a new paragraph with "Therefore";
line 35, change "1" (both occurrences) to --$\ell$--.

UNITED STATES PATENT AND TRADEMARK OFFICE
CERTIFICATE OF CORRECTION

PATENT NO. : 5,349,486
DATED : September 20, 1994
INVENTOR(S) : SUGIMOTO et al.

It is certified that error appears in the above-indentified patent and that said Letters Patent is hereby corrected as shown below:

Col. 12, line 60, change "$\rho K_{xi}$" to --$\Sigma K_{xi}$--.

Signed and Sealed this

Fourteenth Day of February, 1995

Attest:

BRUCE LEHMAN

Attesting Officer

Commissioner of Patents and Trademarks